US007556888B2

(12) United States Patent
Cui et al.

(10) Patent No.: US 7,556,888 B2
(45) Date of Patent: Jul. 7, 2009

(54) ELECTROCHEMICAL CELL

(75) Inventors: Ning Cui, Lyndhurst, OH (US); Peter R. Tsai, Avon, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 383 days.

(21) Appl. No.: 10/778,457

(22) Filed: Feb. 13, 2004

(65) Prior Publication Data

US 2005/0181278 A1 Aug. 18, 2005

(51) Int. Cl.
*H01M 4/42* (2006.01)
(52) U.S. Cl. ..................... 429/229; 429/218.1
(58) Field of Classification Search ................. 429/229, 429/223, 218.1, 230, 231
See application file for complete search history.

(56) References Cited

U.S. PATENT DOCUMENTS

| | | | | |
|---|---|---|---|---|
| 3,853,625 A | * | 12/1974 | Louzos | ....................... 429/229 |
| 4,470,939 A | | 9/1984 | Schoolcraft | |
| 5,283,139 A | | 2/1994 | Newman et al. | |
| 6,150,052 A | * | 11/2000 | Urry | ........................... 429/128 |
| 6,221,527 B1 | * | 4/2001 | Tang | ........................ 429/218.1 |
| 6,627,349 B2 | | 9/2003 | Urry et al. | |
| 6,673,494 B2 | | 1/2004 | West et al. | |
| 2003/0207173 A1 | | 11/2003 | Wang et al. | |
| 2004/0013940 A1 | | 1/2004 | Horn | |
| 2004/0141872 A1 | | 7/2004 | Tsai et al. | |
| 2004/0166413 A1 | * | 8/2004 | Clash et al. | .................. 429/229 |

FOREIGN PATENT DOCUMENTS

| | | |
|---|---|---|
| EP | 1194964 | 1/2001 |
| GB | 2379326 A | 3/2003 |
| JP | 2000215888 | 8/2000 |
| WO | WO 98/20569 A1 | 5/1998 |

* cited by examiner

*Primary Examiner*—Patrick Ryan
*Assistant Examiner*—Monique Wills
(74) *Attorney, Agent, or Firm*—Russell H. Toye, Jr.

(57) ABSTRACT

A cylindrical alkaline electrochemical cell is disclosed that includes a gel free anode. The anode includes a free flowing zinc powder with a preassembly tap density between 1.6 g/cc and 2.9 g/cc. In one embodiment, zinc powder with the desired tap density may be obtained by mixing zinc agglomerates with zinc flakes.

30 Claims, 7 Drawing Sheets

ELECTROCHEMICAL CELL

BACKGROUND OF THE INVENTION

This present invention is directed to electrochemical cells that incorporate zinc in the anode. The invention is particularly directed to alkaline electrochemical cells wherein zinc powder is the electrochemically active material in the anode.

Electrochemical cells, having either a prismatic or cylindrical shape, are suitable for use by consumers in a wide variety of devices such as flashlights, radios and cameras. The cylindrical batteries used in these devices typically employ a tubularly shaped metal container to house two electrodes, a separator, a quantity of electrolyte and a closure assembly that includes a current collector. Typical electrode materials include manganese dioxide as the electrochemically active material in the cathode and zinc as the electrochemically active material in the anode. An aqueous solution of potassium hydroxide is a common electrolyte. A separator, conventionally formed from one or more strips of paper, is positioned between the electrodes. The electrolyte is readily absorbed by the separator and anode.

Commercially available cylindrical alkaline batteries use an anode that includes zinc powder. The anode includes a gel, zinc powder and an aqueous electrolyte. The gel is formed by contacting a powdered gelling agent with a liquid, such as the cell's aqueous based electrolyte, which is readily absorbed by the gelling agent to form the gel. The zinc particles are mixed with and uniformly dispersed throughout the gel so that particle-to-particle contact establishes an electrically conductive matrix throughout the anode. Unfortunately, the gel negatively impacts the cost and service performance of the cell in at least four ways. First, the gel occupies space that could be used to hold additional zinc powder that would increase the electrochemical capacity of the anode. Second, the space occupied by the gel could be dedicated to holding reaction products that accumulate within the anode during discharge thereby delaying or avoiding a detrimental phenomenon known as "anode shut down". The anode shuts down when the anode's reaction products form a semi permeable layer on the surface of the anode. The layer increases the cell's polarization thereby reducing the time that the battery can power a device. Third, the gelling agent causes the anode to be difficult to process in high speed assembly machines. In particular, the gel tends to form lumps within the piping that is used to convey the anode from the anode manufacturing area to the cell assembly area. The lumps disrupt the anode distribution process which ultimately increases the cost of manufacturing the cells. Fourth, the gelling agent slows down or prevents the transmission of hydrogen gas through the anode thereby inhibiting the cell's ability to safely release hydrogen from the cell. If the gas, which is generated in the anode, cannot escape from the anode and then the cell, the cell's internal pressure may increase and activate the cell's safety vent which effectively terminates the useful life of the cell.

As disclosed in the three patents described below, battery manufacturers have sought ways to eliminate the gel from the anode of alkaline cells. U.S. Pat. No. 6,150,052, discloses an alkaline cell design that utilizes a plurality of stacked zinc discs instead of particulate zinc powder. The spacing between the discs provides room for reaction products to accumulate during discharge of the cell thereby delaying or avoiding the creation of a reaction product skin that could cause an increase in the cell's polarization and lead to premature cell failure. While the use of zinc discs is an effective way to avoid an increase in the anode's polarization when compared to similar cells that utilize particulate zinc powder, the discs must be punched from sheets of zinc, oriented and stacked before inserting them into the cell's separator lined cavity. These additional steps increase the cost of manufacturing the cell and thus the "stacked disc" cell construction described above may not be an economically viable option for battery manufacturers that produce millions of batteries each year on high speed assembly machines. Another example of a cell design that improves the battery's run time by delaying or avoiding the formation of a reaction product skin on the anode is disclosed in U.S. Pat. No. 6,627,349. One of the embodiments in this patent utilizes a slotted zinc tube that has a spine and a plurality of ribs supported by the spine. In another embodiment, the anode's electrochemically active material is a coiled strip of zinc having overlapping layers. Unfortunately, the embodiments shown in U.S. Pat. No. 6,627,349 require process steps to cut slots in the zinc tube or cut and coil the strip of zinc. These steps increase the cost of manufacturing the cell relative to cells that utilize particulate zinc powder. U.S. Pat. No. 6,673,494 discloses an alkaline cell that utilizes an expanded zinc mesh anode in place of an anode containing zinc powder and a gelling agent. The specification teaches that a gelling agent is not desirable because it may interfere with ion transport. More specifically, the specification suggests eliminating or decreasing the amount of the gelling agent in order to simplify the battery design and reduce costs. The inventors teach replacing the mixture of zinc powder and gelling agent with an expanded zinc mesh which may be folded, layered or coiled. Although the use of a zinc mesh is described as offering advantages over the use of a conventional anode formed from a mixture of zinc powder, gelling agent and electrolyte, the zinc mesh cannot be conveyed and dispensed in the machines currently used by the major battery manufacturers to assemble alkaline cells at rates that exceed 300 cells per minute. Converting from an anode that uses zinc powder to one that uses expanded zinc mesh would require the battery manufacturers to invest substantial sums of money in the design, fabrication and installation of new anode dispensing equipment. Consequently, the use of expanded zinc mesh may not be economically viable for established producers of cylindrical alkaline batteries.

Therefore, there exists a need for an alkaline cell that incorporates a gel free anode having zinc powder as the electrochemically active material.

BRIEF SUMMARY OF THE INVENTION

The present invention provides an electrochemical cell with a gel free anode that can be dispensed on high speed assembly equipment designed to handle zinc powder.

In one embodiment, an electrochemical cell of the present invention includes the following components. A container with a first electrode disposed therein. The first electrode contacts the container and defines a cavity. A separator lines the cavity. A gel free second electrode is disposed in the separator lined cavity. The second electrode includes zinc powder having a preassembly tap density greater than 1.6 g/cc and less than 2.9 g/cc.

In another embodiment, the present invention is a process for manufacturing an electrochemical cell using the following steps. In a step, providing a container having a first electrode and a separator therein. The separator contacts the first electrode and defines a cavity therein. In another step, providing a gel free second electrode including zinc powder having a preassembly tap density greater than 1.6 g/cc and less than 2.9 g/cc. Disposing the second electrode into the cavity in another step. Securing a sealing member to said container in yet another step.

DETAILED DESCRIPTION OF THE INVENTION

The following terms are defined for use herein.

Figure 1A:
FIG. 1a is a scanning electron microscope (SEM) micrograph of particulate zinc.

The phrase "particulate zinc" means a collection of zinc particles that represent a wide array of irregular shapes and sizes. Almost every particle appears to have a unique shape and/or size. Shown in FIG. 1a is an SEM micrograph of particulate zinc.

Figure 1B:
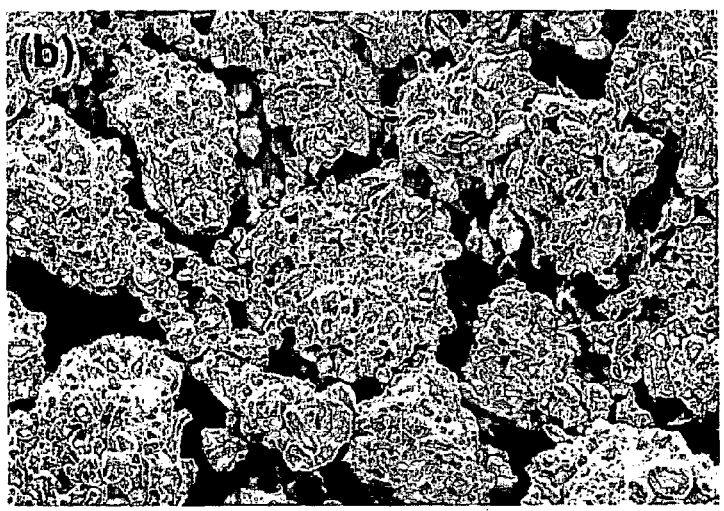
FIG. 1b is an SEM micrograph of zinc agglomerates.

The term "agglomerate", when used as a noun, means an assemblage of particles which are either loosely or rigidly joined together. Particles may be joined together via the presence of an agglomerant or, if an agglomerant is not present, each particle is physically secured to at least one other particle in the agglomerate. Agglomerates may be manually crushed thereby disassociating the particles from one another. Particles that are in close proximity to one another but are not associated via an agglomerant or physical connection are not considered to form an agglomerate. Shown in FIG. 1b is a SEM micrograph of zinc agglomerates.

The phrase "agglomerated particles" means two or more particles that form an agglomerate.

The phrase "nonagglomerated particles" means two or more particles that are not physically associated with each other.

The phrase "zinc powder" means a collection of zinc particles that form a free flowing powder. The zinc powder is considered to be free flowing if it can be poured like dry sand from a container, such as a glass beaker, by tipping the container from a vertical position to a horizontal position. The powder must readily flow from the container without using any external force, such as tapping the container or stirring the powder, to cause the powder to flow from the container. The particles may be agglomerated particles or nonagglomerated particles. Furthermore, the particles may be flakes, spheres, rods, irregularly shaped, and particulate zinc as defined above, or mixtures thereof.

The phrase "the zinc powder's preassembly tap density" means the tap density of the zinc powder just prior to mixing the zinc powder with any other components used to manufacture the anode. The phrase "preassembly tap density" may be used in a similar manner to describe the tap density of other materials, such as zinc agglomerates, before they are mixed with any other components.

Figure 2:
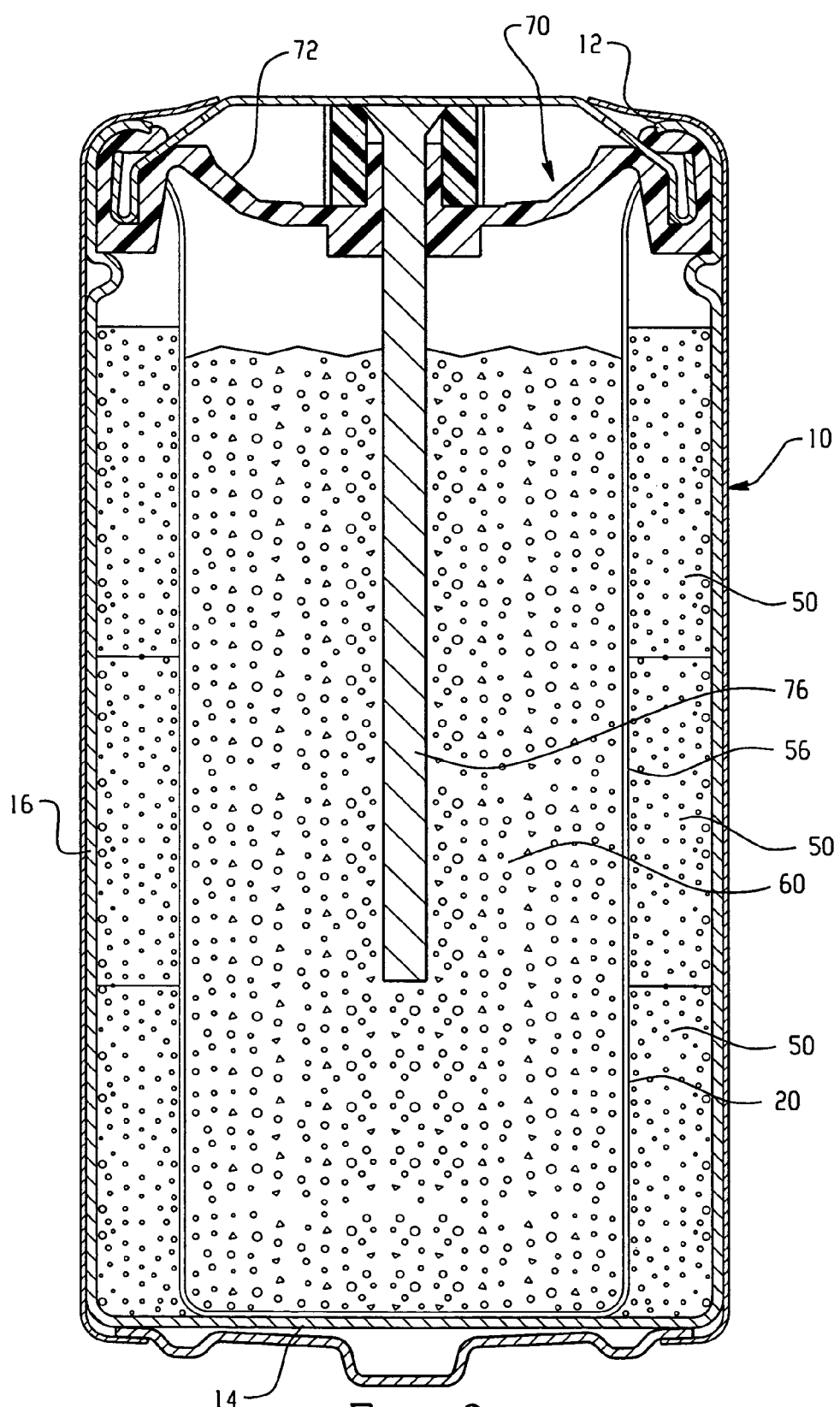
FIG. 2 is a cross sectional view of a conventional alkaline cell.

Referring now to the drawings and more particularly to FIG. 2, there is shown a cross-sectional view of a conventional electrochemical cell. Beginning with the exterior of the cell, the cell's components are the container 10, first electrode 50 positioned adjacent the interior surface of container 10, separator 20 contacting the interior surface 56 of first electrode 50, second electrode 60 disposed within the cavity defined by separator 20, and closure member 70 which is secured to container 10. Container 10 has an open end 12, a closed end 14 and a sidewall 16 therebetween. The closed end 14, sidewall 16 and closure member 70 define a volume in which the cell's electrodes are housed.

Second electrode 60 includes a gelling agent that swells upon absorption of the cell's electrolyte. A gelling agent suitable for use in a conventional cell is a crosslinked polyacrylic acid, such as Carbopol 940®, which is available from Noveon of Cleveland, Ohio, USA. Carboxymethyylcellulose, polyacrylamide and sodium polyacrylate are examples of other gelling agents that are suitable for use in an alkaline electrolyte solution. The zinc powder may be pure zinc or an alloy comprising an appropriate amount of one or more of the metals selected from the group consisting of indium, lead, bismuth, lithium, calcium and aluminum. The zinc particles are suspended in the gelled medium.

Closure member 70 is secured to the open end of the container thereby sealing the electrochemically active ingredients within the cell. The closure member includes a seal member 72 and a current collector 76. In other embodiments, the seal body could be a ring shaped gasket. The seal member includes a vent that will allow the seal member to rupture if the cell's internal pressure becomes excessive. The seal member may be made from Nylon 6,6 or another material, such as a metal, provided the current collector is electrically insulated from the container which serves as the current collector for the first electrode. Current collector 76 is an elongated nail shaped component made of brass. The collector is inserted through a centrally located hole in the seal member.

The cell's electrolyte is an aqueous solution of potassium hydroxide. The electrolyte may be incorporated into the cell by disposing a quantity of the fluid electrolyte into the cavity defined by the first electrode. The method used to incorporate electrolyte into the cell is not critical provided the electrolyte is in contact with the first electrode 50, second electrode 60 and separator 20.

Figure 3:
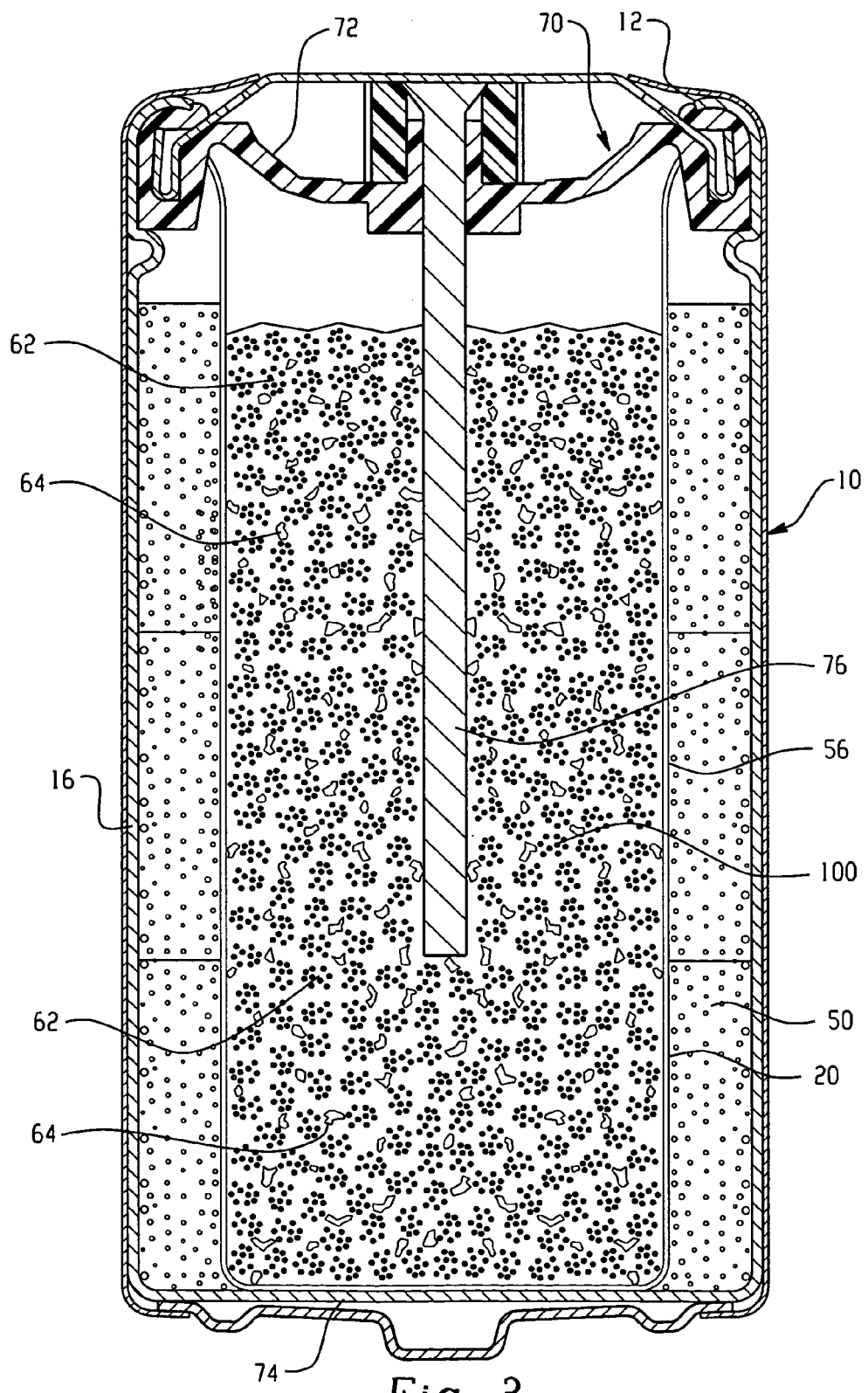
FIG. 3 is a cross sectional view of a cell of this invention.

FIG. 3 shows a cell of this invention. All of the cell's components shown in FIG. 3 are identical to the corresponding components in FIG. 2 except for second electrode 100 which will now be described in detail. Second electrode 100, shown in FIG. 3, is distinguishable over second electrode 60, shown in FIG. 2, because second electrode 100 does not contain a gelling agent. Unlike cells in the prior art, second electrode 100 is gel free and contains a zinc powder with a preassembly tap density greater than 1.6 g/cc and less than 2.9 g/cc. The zinc powder shown in FIG. 3 includes zinc agglomerates 62 and zinc flakes 64. Zinc agglomerates 62 are represented in FIG. 3 as a series of closely grouped particles which are intended to represent the agglomerates shown in FIG. 1b. The zinc flakes 64 shown in FIG. 3 are intended to represent the flakes shown in FIG. 1c. Other zinc powders that do not comprise agglomerates and/or flakes could be used provided the powder's tap density is greater than 1.6 g/cc and less than 2.9 g/cc. As used herein, the phrase "gel free" means that the second electrode does not contain a component that absorbs the cell's electrolyte and then swells to at least five times its original volume thereby occupying much more volume in the absorbed state than in its dry, preabsorbed, state. By selecting a zinc powder with a preassembly tap density within the desired range, preferably between 1.7 g/cc and 2.5 g/cc, more preferably between 1.8 g/cc and 2.2 g/cc, most preferably around 2.0 g/cc, the zinc powder occupies the volume defined by the separator lined cavity and, at the same time, the particles of zinc are able to establish and maintain an electrically conductive matrix throughout the zinc powder during the complete discharge of the cell. Furthermore, the particles of zinc are able to maintain electrical contact with current collector 76. The ability to maintain electrical contact throughout the anode is particularly important in cells that contain less than 50 ppm of mercury in the anode and are known in the battery industry as zero mercury batteries.

Figure 1C:
FIG. 1c is an SEM micrograph of zinc flakes.

Most commercially available processes used to produce particulate zinc powder for the battery industry, such as an air atomization process or a centrifugal atomization process, are not designed to manufacture zinc powder having a preassembly tap density below 3.0 g/cc. One way to obtain a zinc powder having a tap density close to 2.0 g/cc is to mix a first zinc powder having a preassembly tap density less than 2.0 g/cc with a second zinc powder having a tap density greater than 2.0 g/cc. In a preferred embodiment, the first zinc powder includes zinc flakes. Zinc flakes suitable for use in a cell of this invention are described in U.S. Pat. No. 6,022,639. Shown in FIG. 1c is an SEM micrograph of zinc flakes. Flakes having a preassembly tap density between 1.1 and 1.7 are particularly preferred. The mixture of the first zinc powder and the second zinc powder may be referred to herein as a composition of zinc powders. In a preferred embodiment, the second zinc powder includes zinc agglomerates. Preferably, all of the particles in the second zinc powder are agglomerated particles and the agglomerates have a preassembly tap density less than 2.9 g/cc.

Figure 4:
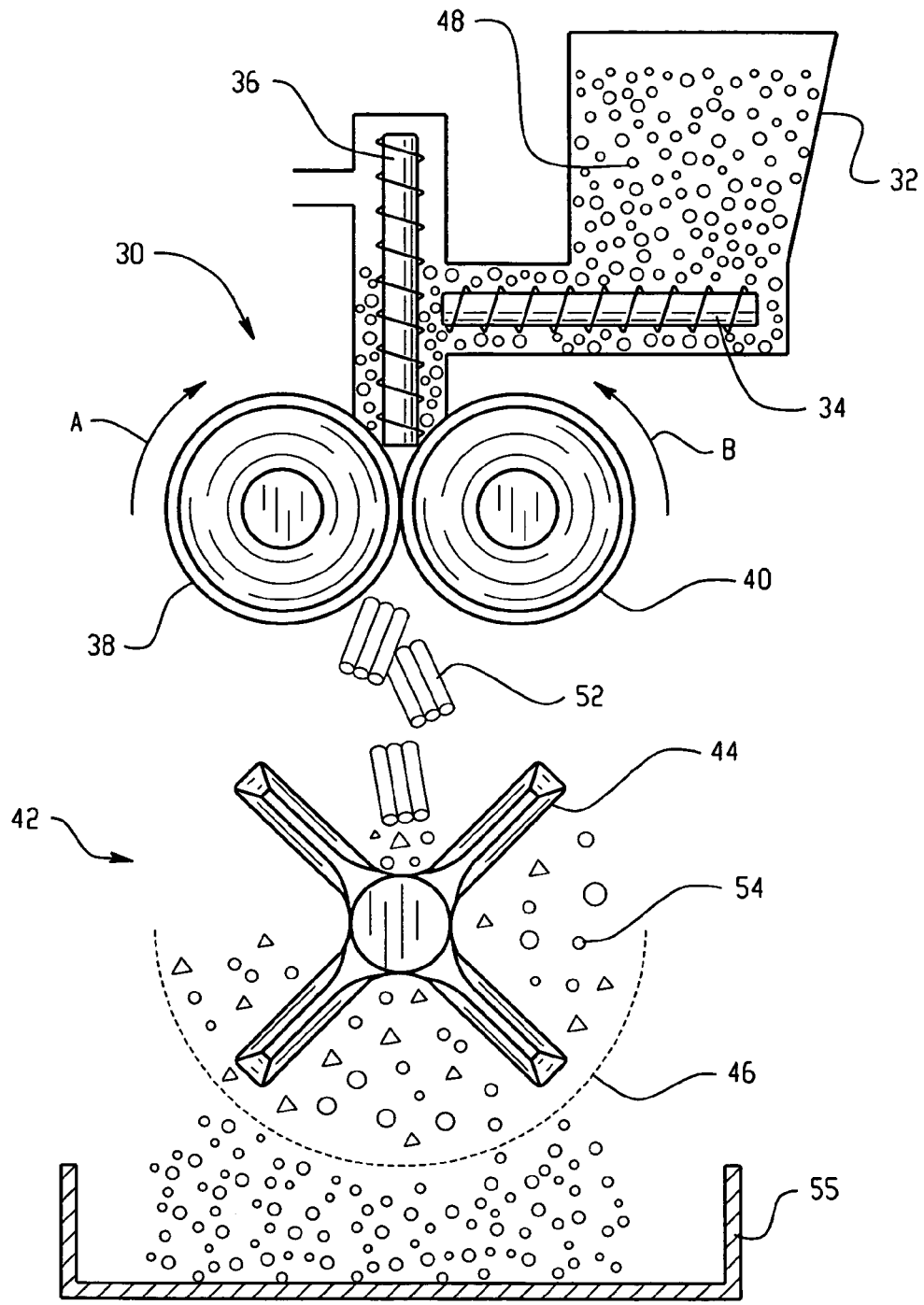
FIG. 4 is a process chart for a compaction process used to manufacture agglomerates that are useful in a cell of this invention.

One process useful in forming zinc agglomerates having a preassembly tap density less than 2.9 g/cc is disclosed in FIG. 4. Referring to FIG. 4, forming of the agglomerates by compaction of the particles can be accomplished by feeding a quantity of zinc particles 48 into the gap (not shown) between opposing rolls in roll compactor 30. Compactor 30 includes a powder storage hopper 32, a first screw conveyor 34 which is a horizontal screw, a second screw conveyor 36 which is a vertical screw, a first roller 38 and a second roller 40. First roller 38 rotates in a clockwise direction, as indicated by arrow A, while second roller 40 rotates in a counterclockwise direction, as indicated by arrow B. Rollers 38 and 40 may be made of hardened steel. The gap (not shown) between rollers 38 and 40 is one of the variables that may be adjusted to form agglomerates with the desired porosity. The surface of rollers 38 and 40 may be modified to increase the coefficient of friction between the roller and the zinc particles 48. In a preferred embodiment, the surface of both rollers is coated with a ceramic layer to improve the coefficient of friction between the rollers and the zinc particles. Alternatively, the surface of the rollers may be sand blasted to improve their ability to grip the zinc particles and force them through the gap between the rollers. Located beneath roll compactor 30 is granulator 42 which includes screen 46. As the zinc particles 48 in hopper 32 are fed to and through the gap between rollers 38 and 40, the powder is formed into thin agglomerated strips 52 that are too long for use in an electrode of a cylindrical LR6 alkaline electrochemical cell that measures approximately 50 mm high and 14 mm in diameter. Strips 52 are made to collide with beater bar assembly 44 which fragments the pellets into smaller rigid agglomerates 54. The openings in sieving screen 46 allow a portion of the fragmented rigid agglomerates to pass through the screen and accumulate in catch basin 55. If desired, the accumulated agglomerates may be processed through additional granulation and screening machinery until rigid, binder free agglomerates within a desired size range are obtained. Preferably, the rigid, binder free agglomerates will pass through a 40 mesh screen. If desired, the agglomerates that pass through a 325 mesh screen may be eliminated.

The second zinc powder may also be made with conventional zinc powder manufacturing processes. Commercially available zinc powders, also referred to herein as particulate zinc, having preassembly tap densities greater than 3.0 g/cc may be purchased from Big River Zinc Corp. (Sauget, Ill. USA), Noranda Inc. (Toronto, Ontario Canada), Grillo-Werke (Duisburg, Germany) or N.V. UMICORE, S.A. (Brussels, Belgium). A preferred second zinc powder having a tap density of approximately 3.2 g/cc is available from UMICORE under the designation BIA 115. Commercially available zinc powders having a tap density greater than 3.5 g/cc are suitable for use as a second zinc powder. In addition to having the desired tap density, this zinc powder has a $D_{50}$ particle size less than 130 microns, a BET specific surface area greater than 400 cm$^2$/g, and a KOH absorption value of at least 14%. The $D_{50}$ particle size, surface area, preassembly tap density and KOH absorption values are determined as follows.

The second zinc powder's particle size is characterized as having a $D_{50}$ median value less than 130 microns, more preferably between 100 and 130 microns, and most preferably between 110 and 120 microns. The $D_{50}$ median value is determined by using the sieve analysis procedure described in the American Society for Testing and Materials (ASTM) standard B214-92, entitled Standard Test Method for Sieve Analysis of Granular Metal Powders, and the reporting procedure described in ASTM D1366-86 (Reapproved 1991), entitled Standard Practice for Reporting Particle Size Characteristics of Pigments. ASTM standards B214-92 and D1366-86 (Reapproved 1991) are herein incorporated by reference. As used in this document, the zinc powder's $D_{50}$ median value is determined by plotting the cumulative weight percentages versus the upper class size limits data, as shown in ASTM D-1366-86, and then finding the diameter (i.e. $D_{50}$) that corresponds to the fifty percent cumulative weight value.

The second zinc powder's BET specific surface area is at least 400 cm$^2$/g. More preferably, the surface area is at least 450 cm$^2$/g. The BET specific surface area is measured on Micromeritics' model TriStar 3000 BET specific surface area analyzer with multi point calibration after the zinc sample has been degassed for one hour at 150° C.

The second zinc powder's preassembly tap density is measured using the following procedure. Dispense fifty grams of the zinc powder into a 50 cc graduated cylinder. Secure the graduated cylinder containing the zinc powder onto a tap density analyzer such as a model AT-2 "Auto Tap" tap density analyzer made by Quanta Chrome Corp. of Boynton Beach, Fla., U.S.A. Set the tap density analyzer to tap five hundred and twenty times. Allow the tap density analyzer to run thereby tapping the graduated cylinder by rapidly displacing the graduated cylinder in the vertical direction five hundred and twenty times. Read the final volume of zinc powder in the graduated cylinder. The tap density of the second zinc powder is determined by dividing the weight of the second zinc powder by the volume occupied by the second zinc powder after tapping.

The following process was used to determine the second zinc powder's KOH absorption value. First, provide a 5 cc syringe and a piece of separator that has been soaked in 32 wt % KOH and is appropriately sized to facilitate insertion of the separator into the large open end of the syringe. The separator is pushed through the syringe toward the opposite end of the syringe thereby blocking zinc particles that will be inserted into the tube from passing through the smaller opening. Second, weigh the syringe and separator containing absorbed electrolyte. Third, dispose two milliliters of a 32% by weight aqueous KOH solution into the large open end of the syringe while blocking the flow of the electrolyte through the smaller opening in the opposite end of the syringe. Fourth, a known quantity of the second zinc powder, such as five grams, is carefully weighed and disposed into the open end of the syringe. The shape of the container, the volume of the solution and the volume of the zinc must be coordinated to insure that all of the zinc particles are fully submerged beneath the surface of the aqueous KOH solution. Fifth, an additional 1.5 cc of 32% by weight KOH solution is introduced into the container to insure that the zinc is fully covered with the solution. Sixth, the KOH solution is allowed to drain through the small opening at one end of the syringe for 120 minutes by orienting the syringe in a vertical position and removing the object that blocks the flow of electrolyte through the small opening. To insure that there are no droplets of unabsorbed solution trapped between the particles of zinc, the container is lightly tapped several times onto a paper towel until no additional KOH solution is observed landing on the paper towel. Seventh, the combined weight of the zinc with the solution adsorbed thereon, the syringe and the separator is then determined. The quantity of electrolyte solution adsorbed onto the surface of the zinc is determined by subtracting the weight of the dry zinc particles, wet separator and syringe from the combined weight of the syringe containing zinc with adsorbed electrolyte thereon and the wet separator. The KOH absorption value is determined by dividing the weight of the KOH adsorbed onto the zinc by the weight of the zinc powder prior to disposing them into the solution.

In addition to the physical characteristics described above, the preferred second zinc powder is an alloy with bismuth and/or indium and/or aluminum incorporated therein. The preferred quantity of bismuth is between 75 and 125 ppm. The preferred quantity of indium is between 175 and 225 ppm. The preferred quantity of aluminum is between 75 and 125 ppm.

Cells of the present invention can be made with a wide variety of zinc powders provided the preassembly tap density of the zinc powder used in the cell is between 1.6 g/cc and 2.9 g/cc. By limiting the preassembly tap density to less than 2.9 g/cc, the cell's anode can be manufactured without a gelling agent because the zinc is sufficiently porous to insure that the zinc adequately fills the space defined by the cell's separator thereby establishing and maintaining continuous electrical contact to essentially all particles of zinc and the anode's current collector while also providing a sufficient quantity of zinc to fuel the cell. At the same time, limiting the preassembly tap density to greater than 1.6 g/cc insures that the cell has at least the minimum amount of zinc needed to avoid electrochemically overbalancing the cell wherein the cell contains undischarged electrochemically active material in the cathode after the anode has been completely discharged. If the zinc's preassembly tap density is too low so that the electrochemical capacity of the cathode is substantially higher than the electrochemical capacity of the anode, the cathode's excessive electrochemical capacity could participate in undesirable chemical reactions which would lead to internal gassing and leakage of electrolyte if the cell's safety vent is activated.

To demonstrate the service advantage made possible by cells of this invention, relative to commercially available cells, several lots of LR6 cells were manufactured and discharged on service tests that are intended to simulate the discharge regimes that a cell would experience when used in a digital still camera. The cells were assembled using the following steps. Provide a tubularly shaped container made of nickel plated steel. The container, which may be referred to herein as a can, has an open end, a closed end and a sidewall therebetween. A first electrode, also referred to herein as a cathode, is created by inserting three identical tubularly shaped rings into the container. The rings are designed with an outside diameter that provides an interference fit with the can's interior surface. The rings are stacked end-to-end to create a tubularly shaped electrode that defines a centrally located cavity. The composition of the first electrode is shown in Table 1.

TABLE 1

| Ingredient | Weight Percent |
| --- | --- |
| Electrolytic Manganese Dioxide | 90.96 |
| Graphite | 4.49 |
| 40 Wt % KOH | 3.72 |
| Coathylene binder | 0.44 |
| niobium doped titanium dioxide | 0.39 |

The rings were formed by mixing the ingredients together to create a powder which was then compacted to form a ring.

After insertion of the rings, a strip of separator paper was coiled to form a tube which was then sealed on one end and subsequently inserted into the cavity defined by the first electrode. The closed end of the separator tube was located proximate the closed end of the can and the open end of the separator tube was located proximate the open end of the can. The separator contacted the inside diameter of the first electrode thereby lining the cavity defined by the first electrode. A separator suitable for use a cell of this invention is described in WO 03/043103 which was published on May 22, 2003. The assembled container, first electrode and separator described above are referred to herein as the cathode subassembly.

Several lots of experimental cells were then manufactured using the cathode subassembly described above. The control cells, designated lot A in table 2 and FIG. 5, contained a conventional anode including a gelling agent and all of the zinc powder was particulate zinc. The formulas of the anodes are shown in Table 2. The quantities of each ingredient are listed in grams.

TABLE 2

| | Lot | | | | | | | |
| --- | --- | --- | --- | --- | --- | --- | --- | --- |
| Ingredient | A | B | C | D | E | F | G | H |
| Particulate Zinc (purchased from Umicore, designated BIA 115) | 4.50 | 0 | 0 | 0 | 0 | 0 | 0 | 0 |
| Agglomerated Zinc | 0 | 4.50 | 4.50 | 4.50 | 4.25 | 4.05 | 3.82 | 3.60 |
| Zinc Flakes | 0 | 0 | 0 | 0 | 0.25 | 0.45 | 0.68 | 0.90 |
| 36 Wt % KOH* | 2.11 | 2.11 | 0 | 0 | 0 | 0 | 0 | 0 |
| Gelling Agent | 0.03 | 0.03 | 0 | 0 | 0 | 0 | 0 | 0 |

*includes 3 weight percent ZnO and 0.3 weight percent sodium silicate

The cells in lot A were made by: (1) disposing a first portion of electrolyte, comprising 1.15 g of a 36.5 weight percent KOH aqueous solution, into the separator lined cavity; (2) disposing 6.6 g of the gelled anode mixture into the separator lined cavity containing the first portion of electrolyte; (3) disposing a second portion of electrolyte, comprising 0.04 g of 36.0 weight percent KOH aqueous solution onto the gelled mixture and (4) securing a sealing member to the open end of the container thereby forming a sealed electrochemical cell. The cells in lot B were identical to the cells in lot A, including the presence of the gelling agent, except that the particulate zinc used in lot A was totally replaced with an equivalent weight of zinc agglomerates. These agglomerates, as well as all of the agglomerates used in the experimental cells described herein, were made from particulate zinc having a $D_{50}$ of approximately 30 microns and the diameters of the agglomerates were limited to between 100 and 300 microns. In contrast to lots A and B, the cells in lot C were made with gel free anodes that used only zinc agglomerates instead of particulate zinc. The cells in lot C were made by (1) disposing a first portion of electrolyte, comprising 1.15 g of a 36.5 weight percent KOH aqueous solution, into the separator lined cavity; (2) then inserting 4.5 g of the gel free zinc agglomerates into the cathode subassembly's separator lined cavity; and (3) then disposing a second portion of electrolyte, comprising 2.15 g of 36.0 weight percent KOH aqueous solution onto the gel free zinc agglomerates that were previously disposed into the separator lined basket that included 1.15 g of electrolyte. If desired, this assembly process could be altered to specify disposing all of the zinc powder into the separator lined cavity and then disposing all of the electrolyte onto and into the cavity containing the dry zinc powder. Another suitable process would include disposing all of the electrolyte into the separator lined cavity and then disposing all of the zinc powder into the cavity containing the electrolyte. Alternatively, the zinc powder and all of the electrolyte could be mixed together and then disposed into the cathode subassembly.

Figure 5:
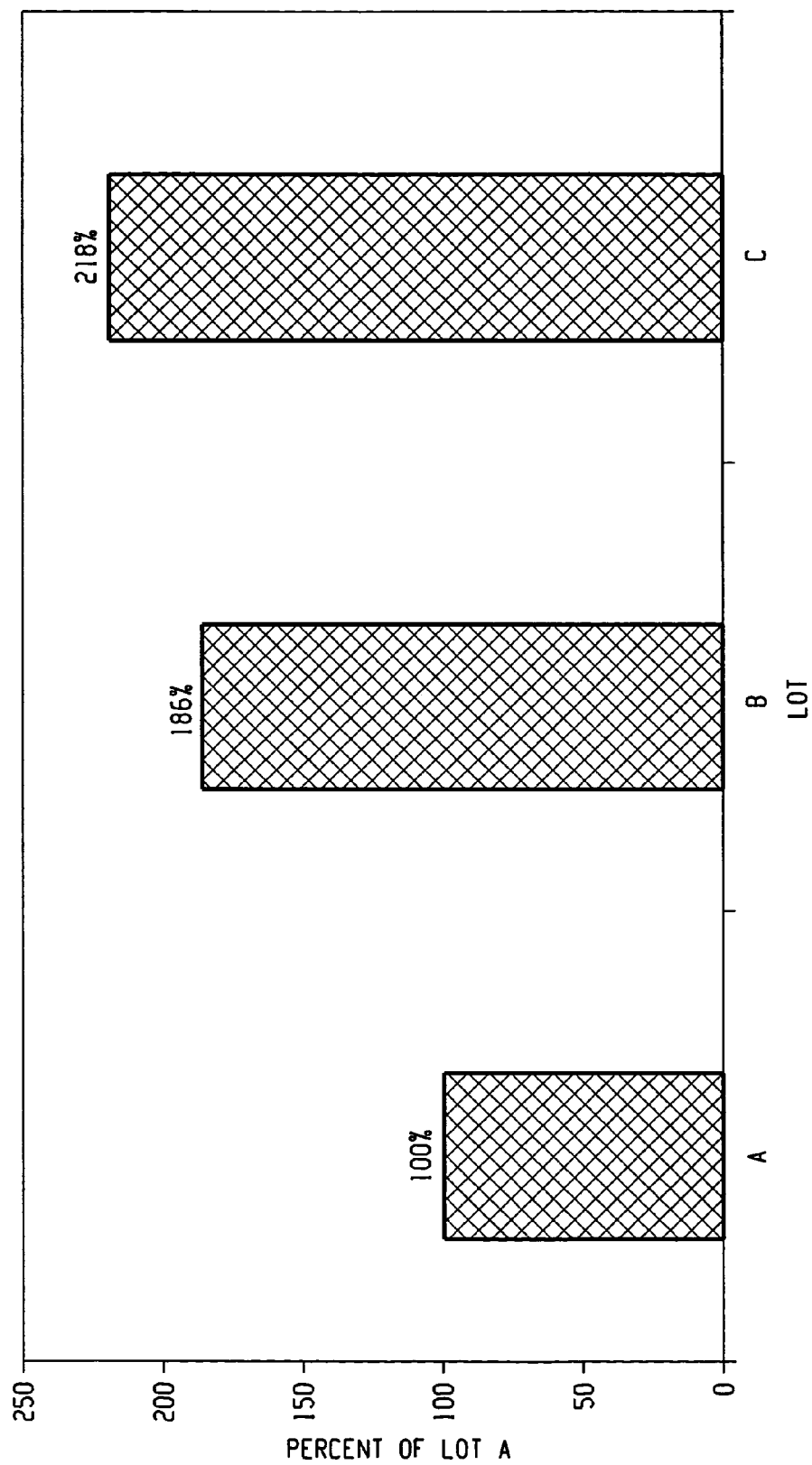
FIG. 5 is a bar chart showing service data from a service test.

After assembling several cells for each of lots A, B and C, five cells from each lot were then discharged at 1,700 milliwatts for 0.5 seconds, followed immediately by 1000 milliwatts for seven seconds and 500 milliwatts for 22.5 seconds. The complete 30 second discharge cycle was immediately repeated nine more times each hour without allowing the cell to rest between each cycle. After the tenth 30 second cycle, the cell was allowed to rest for 55 minutes. The test was repeated each hour until the cell's closed circuit voltage dropped below 1.1 volts. This test, which is defined herein as a first digital still camera (DSC) test, is intended to represent a discharge regime on some digital still cameras. The data from the test is shown in FIG. 5. The average number of cycles completed by the five cells in lot A was defined as 100% in FIG. 5. As shown in FIG. 5, the average number of cycles completed by the cells in lot B, wherein the particulate zinc was replaced with zinc agglomerates having a tap density of 2.55 g/cc, was 86% higher than the average number of cycles completed by the cells in lot A. Also shown in FIG. 5 is the average performance of five cells in lot C which completed 118% more cycles than the average of the cells in lot A. This data clearly shows that removing the gelling agent from the anode and replacing the particulate zinc having a tap density of 3.55 g/cc with zinc agglomerates having a tap density of 2.55 g/cc resulted in a cell construction that provided 118% more service on a digital still camera test.

Figure 6:
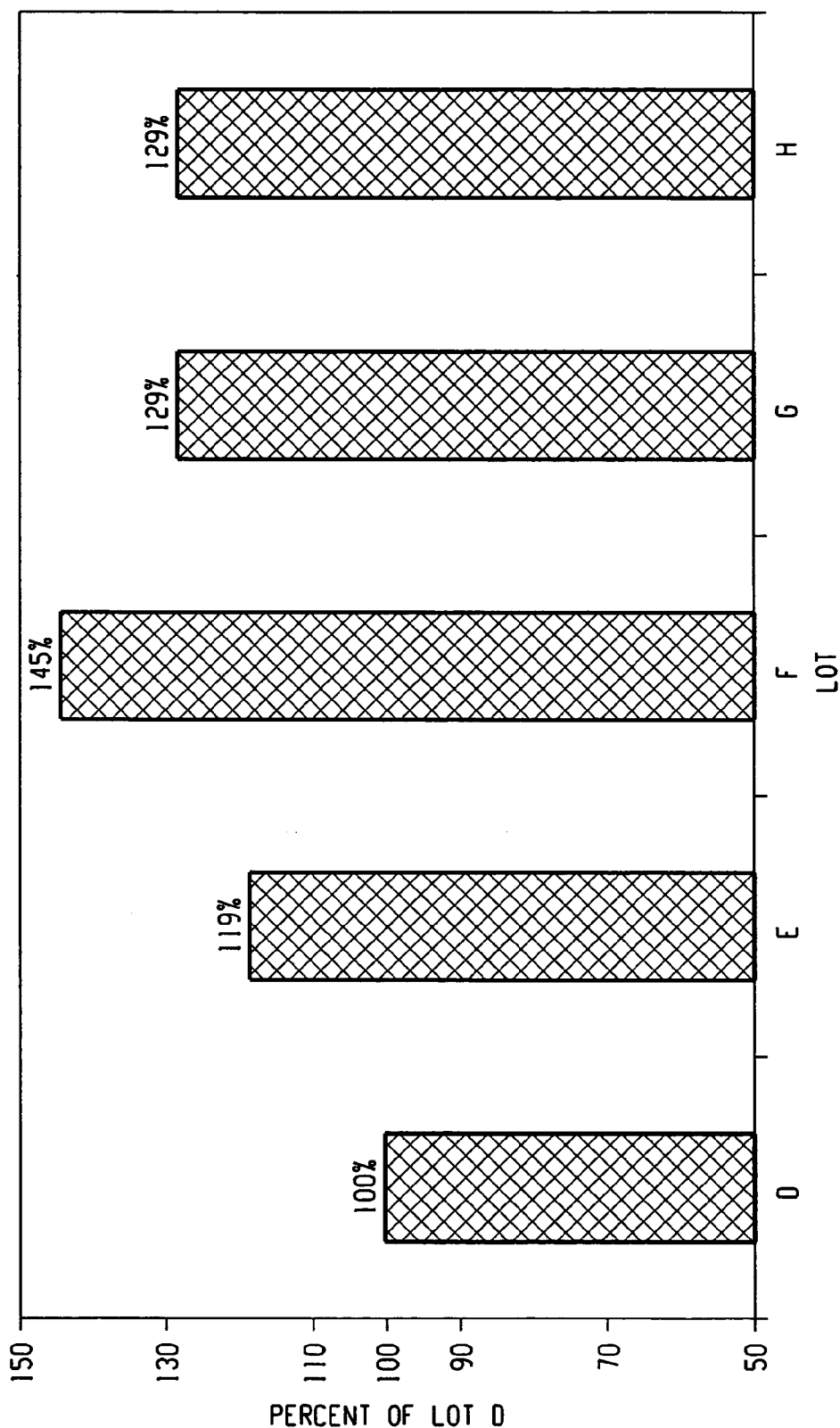
FIG. 6 is a bar chart showing service data from another service test.
Figure 7:
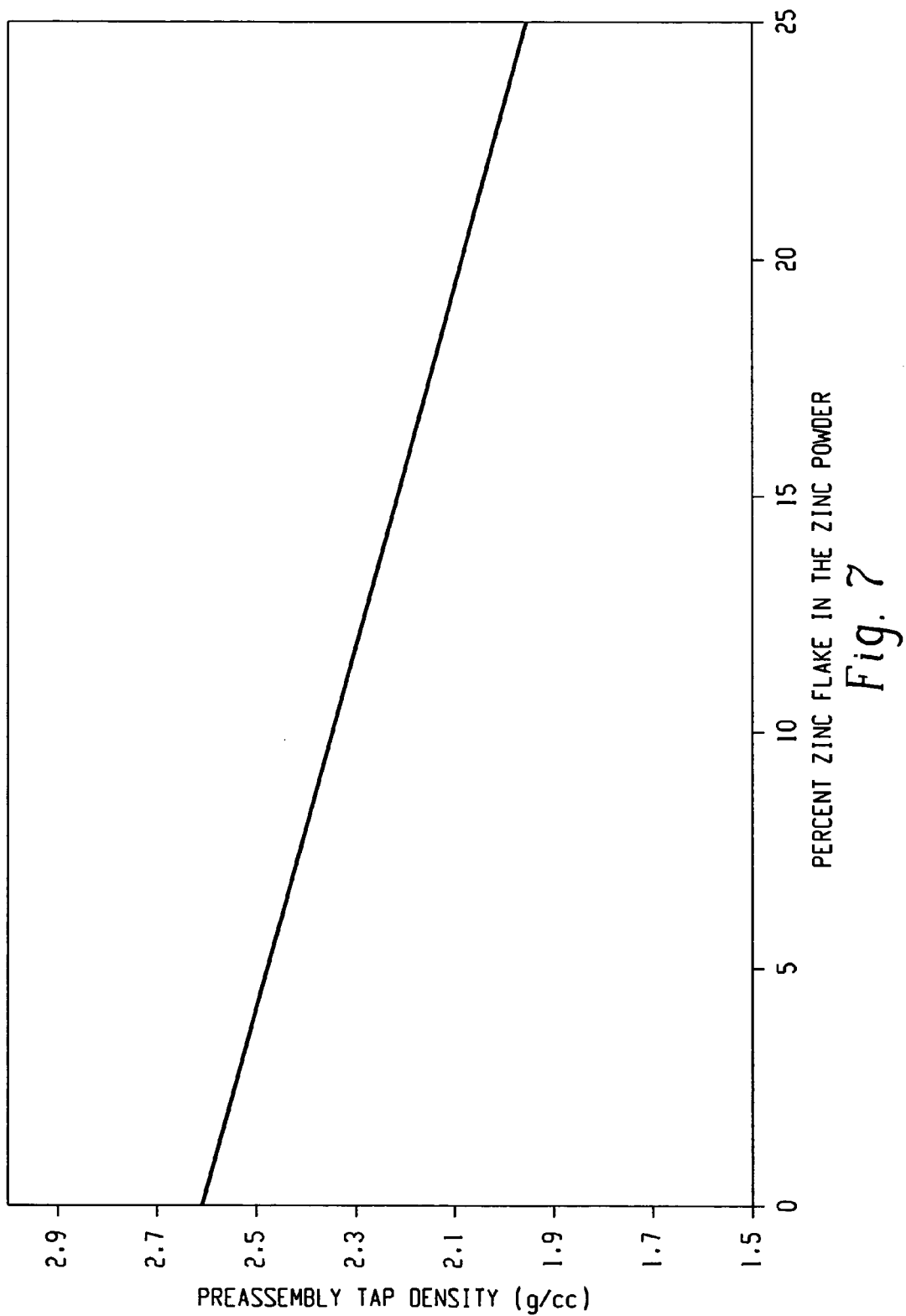
FIG. 7 is a graph showing tap density versus percent flake in the zinc powder.

Shown in FIG. 6 is test data from five lots of cells designated lots D, E, F, G and H. These cells were discharged on a second DSC test per the following test regime which is indicative of a cell's performance in some digital still cameras. Each cell was discharged at 1,500 milliwatts for two seconds, then 650 milliwatts for 28 seconds to complete the 30 second cycle. The cycle was repeated nine more times without allowing the cells to rest between each cycle. After the tenth discharge cycle, the cell then rested for fifty-five minutes. The cell was discharged each hour until the cell's closed circuit voltage dropped below 1.05 volts. The cells in lot D were identical to the cells in lot C which utilized a gel free anode and the cell's zinc powder included only zinc agglomerates having a 2.55 g/cc tap density. Five cells from lot D were discharged on the second DSC discharge test described above. The average number of cycles completed by the five cells in lot D was defined as 100% in FIG. 6. The average performances of the cells from lots E, F, G and H were then normalized to the performance of the cells in lot D. The cells in lot E were identical to the cells in lot D except that, prior to disposing the zinc powder into the cathode subassembly during the cell assembly process, five weight percent of the zinc agglomerates was replaced with an equivalent weight of zinc flakes that were purchased from Transmet Corporation of Columbus, Ohio USA. The total weight of the zinc agglomerates and zinc flakes may be referred to herein as the total weight of the composition of zinc powder. The tap density of the zinc flakes was approximately 1.15 g/cc. Typical dimensions of the flakes are as follows: 550 microns wide by 550 microns long by 20 microns thick. Substituting the zinc flake for the agglomerates increased the cell's service by 19 percent relative to the cells in lot D. By mixing the agglomerates with the flakes, the zinc powder's tap density dropped from 2.6 g/cc to 2.5 g/cc. Shown in FIG. 7 is a graph which documents the drop in the zinc powder's preassembly tap density as a portion of the zinc agglomerates is replaced by an equivalent portion, based on weight, of zinc flake. FIG. 7 shows that substituting zinc flake for twenty-five percent of the zinc agglomerates reduced the zinc powder's tap density from approximately 2.6 g/cc to approximately 1.9 g/cc. Further reduction in the zinc powder's tap density could be achieved by increasing the percentage of zinc flakes above twenty-five percent. The cells in lot F were identical to the cells in lot D except that ten weight percent of the zinc agglomerates was replaced with an equivalent weight of zinc flakes. When discharged on the second DSC test, five cells from lot F provided, on average, 45% more service than the cells in lot D. This increase in service performance is particularly noteworthy because the cells in lot D represent a 118% increase in service performance over conventional cells, represented by lot A, that contained gelled anodes utilizing only particulate zinc having a tap density of 3.55 g/cc. The cells in lots G and H were made by substituting 15 weight percent and 20 weight percent, respectively, of the zinc agglomerates with zinc flakes. The average service performance of five cells from lot G and lot H was approximately 29% greater than the cells in lot D. The decrease in service provided by cells from lots G or H, relative to cells in lot F, is believed to be attributable to the nonoptimized zinc surface area to electrolyte ratio caused by substituting more than 10% by weight zinc flake for the zinc agglomerates.

In summary, the datum in FIGS. 5 and 6 clearly demonstrates that eliminating the gel from the anode and using zinc powder with a preassembly tap density of 2.6 g/cc or less resulted in significant increases in the cell's performance on tests that simulate use in digital still cameras. Furthermore, decreasing the zinc powder's preassembly tap density to approximately 2.35 g/cc by substituting zinc flake for 10%, by weight, of the zinc agglomerates resulted in a substantial increase in service performance relative to conventional batteries that use a gelled anode and particulate zinc.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention. The scope of protection afforded is to be interpreted by the claims and by the breadth of interpretation allowed by law.

We claim:

1. An electrochemical cell, comprising:
    a) a container;
    b) a first electrode disposed in said container, said first electrode contacting said container and defining a cavity therein;
    c) a separator lining said cavity; and
    d) a gel free second electrode disposed in said separator lined cavity, said second electrode comprising an agglomerated zinc powder containing less than 50 ppm of mercury and having a preassembly tap density greater than 1.6 g/cc and less than 2.9 g/cc.

2. The electrochemical cell, as defined in claim 1, wherein the second electrode further comprises zinc flakes.

3. The electrochemical cell, as defined in claim 2, wherein the zinc powder's preassembly tap density is greater than 1.8 g/cc and less than 2.2 g/cc.

4. The electrochemical cell, as defined in claim 1, wherein the zinc powder is alloyed with at least one selected from the group consisting of: bismuth, indium and aluminum.

5. The electrochemical cell, as defined in claim 4, wherein the zinc powder's preassembly tap density is greater than 1.8 g/cc and less than 2.2 g/cc.

6. The electrochemical cell, as defined in claim 4, wherein the second electrode further comprises zinc flakes.

7. An electrochemical cell comprising:
    a) a container;
    b) a first electrode disposed in said container, said first electrode contacting said container and defining a cavity therein;
    c) a separator lining said cavity;
    d) a gel free second electrode disposed in said separator lined cavity, said second electrode comprising an electrochemically active material and less than 50 ppm of mercury, said electrochemically active material consisting essentially of a mixture of zinc powders, said mixture of zinc powders comprising a first zinc powder, a second zinc powder and an optional alloy material, said first zinc powder having a preassembly tap density less than 2.0 g/cc and second zinc powder having a preassembly tap density greater than 2.0 g/cc; and
    e) wherein the mixture of zinc powders includes agglomerated particles.

8. The electrochemical cell, as defined in claim 7, wherein said second zinc powder has a tap density greater than 3.0 g/cc.

9. The electrochemical cell, as defined in claim 7, wherein said second zinc powder has a tap density greater than 3.2 g/cc.

10. The electrochemical cell, as defined in claim 7, wherein said second zinc powder has a tap density greater than 3.5 g/cc.

11. The electrochemical cell, as defined in claim 7, wherein said first zinc powder has a tap density less than 1.7 g/cc.

12. The electrochemical cell, as defined in claim 7, wherein said first zinc powder has a tap density greater than 1.1 g/cc.

13. The electrochemical cell, as defined in claim 7, wherein said mixture of zinc powders also includes zinc flakes.

14. The electrochemical cell, as defined in claim 7, wherein said first zinc powder consists essentially of zinc flakes and said second zinc powder consists essentially of zinc agglomerates and particles associated with the zinc agglomerates.

15. The electrochemical cell, as defined in claim 7, wherein said first zinc powder is at least 5 weight percent of the total weight of said composition of zinc powders.

16. The electrochemical cell, as defined in claim 7, wherein said first portion of zinc powder is at least 10 weight percent of the total weight of said composition of zinc powders.

17. The electrochemical cell, as defined in claim 7, wherein said first portion of zinc powder is at least 15 weight percent of the total weight of said composition of zinc powders.

18. The electrochemical cell, as defined in claim 7, wherein said first portion of zinc powder is at least 20 weight percent of the total weight of said composition of zinc powders.

19. A process for manufacturing an electrochemical cell, comprising:
    a. providing a container comprising a first electrode and a separator, said separator contacting said first electrode and defining a cavity therein;
    b. providing a second electrode comprising an electrochemically active material with less than 50 ppm of mercury, said electrochemically active material consisting essentially of a zinc powder having agglomerated particles and a preassembly tap density greater than 1.6 g/cc and less than 2.9 g/cc and said second electrode not containing any gelling agents;
    c. disposing said second electrode into said cavity; and
    d. securing a sealing member to said container.

20. The process of claim 19, further comprising the step of forming the zinc powder by mixing a first zinc powder having a preassembly tap density less than 2.0 g/cc and a second zinc powder having a preassembly tap density greater than 2.0 g/cc.

21. The process of claim 20, wherein said second zinc powder has a tap density greater than 3.0 g/cc.

22. The process of claim 20, wherein said second zinc powder has a tap density greater than 3.2 g/cc.

23. The process of claim 20, wherein said second zinc powder has a tap density greater than 3.5 g/cc.

24. The process of claim 20, wherein said first zinc powder has a tap density less than 1.7 g/cc.

25. The process of claim 20, wherein said first portion of zinc powder has a tap density greater than 1.1 g/cc.

26. The process of claim 19, wherein the zinc powder is alloyed with at least one selected from the group consisting of: bismuth, indium and aluminum.

27. The process of claim 19, wherein said zinc powder is disposed into said cavity prior to disposing the electrolyte into said cavity.

28. The process of claim 19, wherein a portion of said electrolyte is disposed into said cavity before said zinc powder is disposed into said cavity.

29. The process of claim 19, wherein said zinc powder and said electrolyte are simultaneously disposed into said cavity.

30. The process of claim 19, wherein said zinc powder and electrolyte are mixed with one another and then disposed into said cavity.

* * * * *